UNITED STATES PATENT OFFICE.

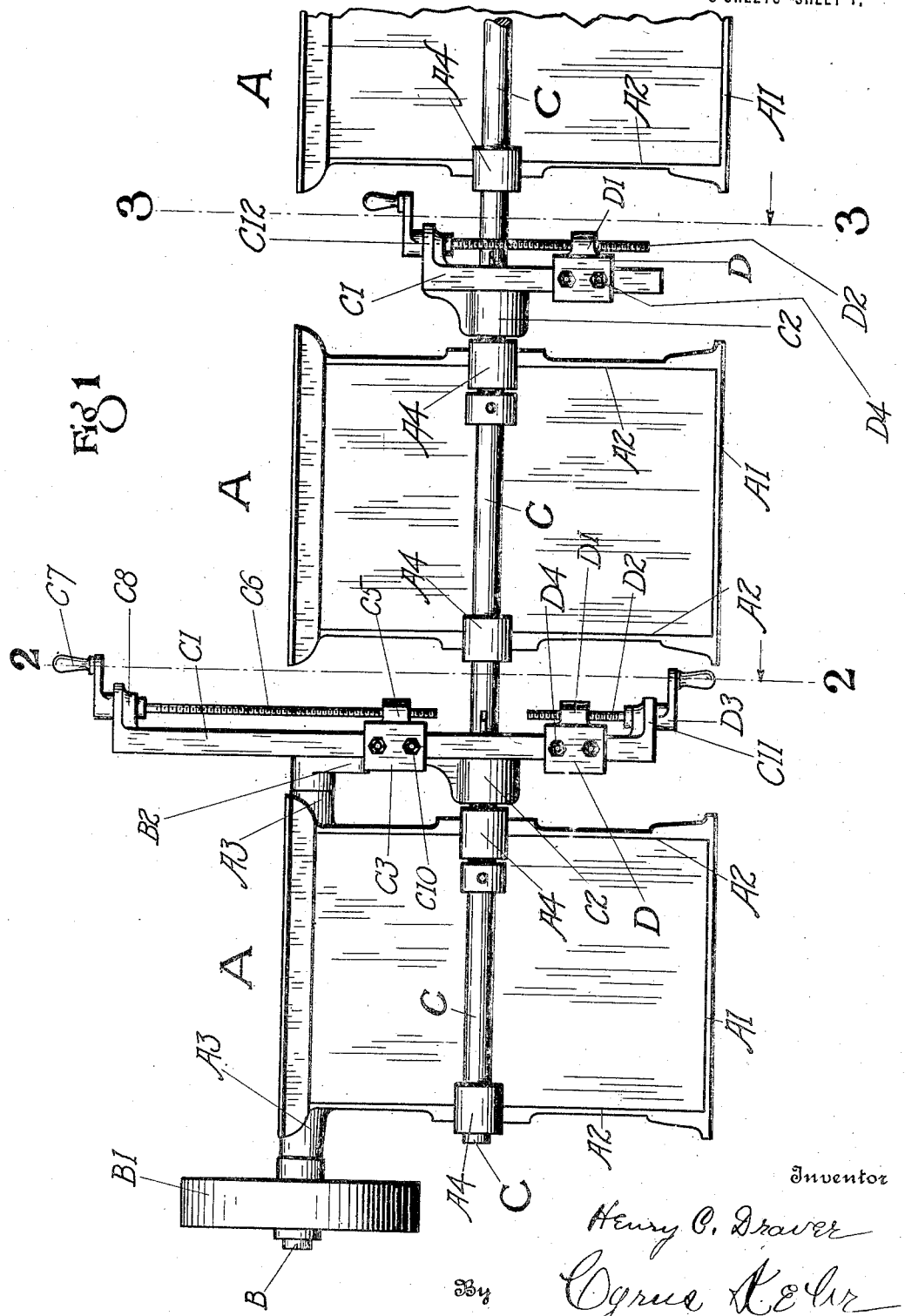

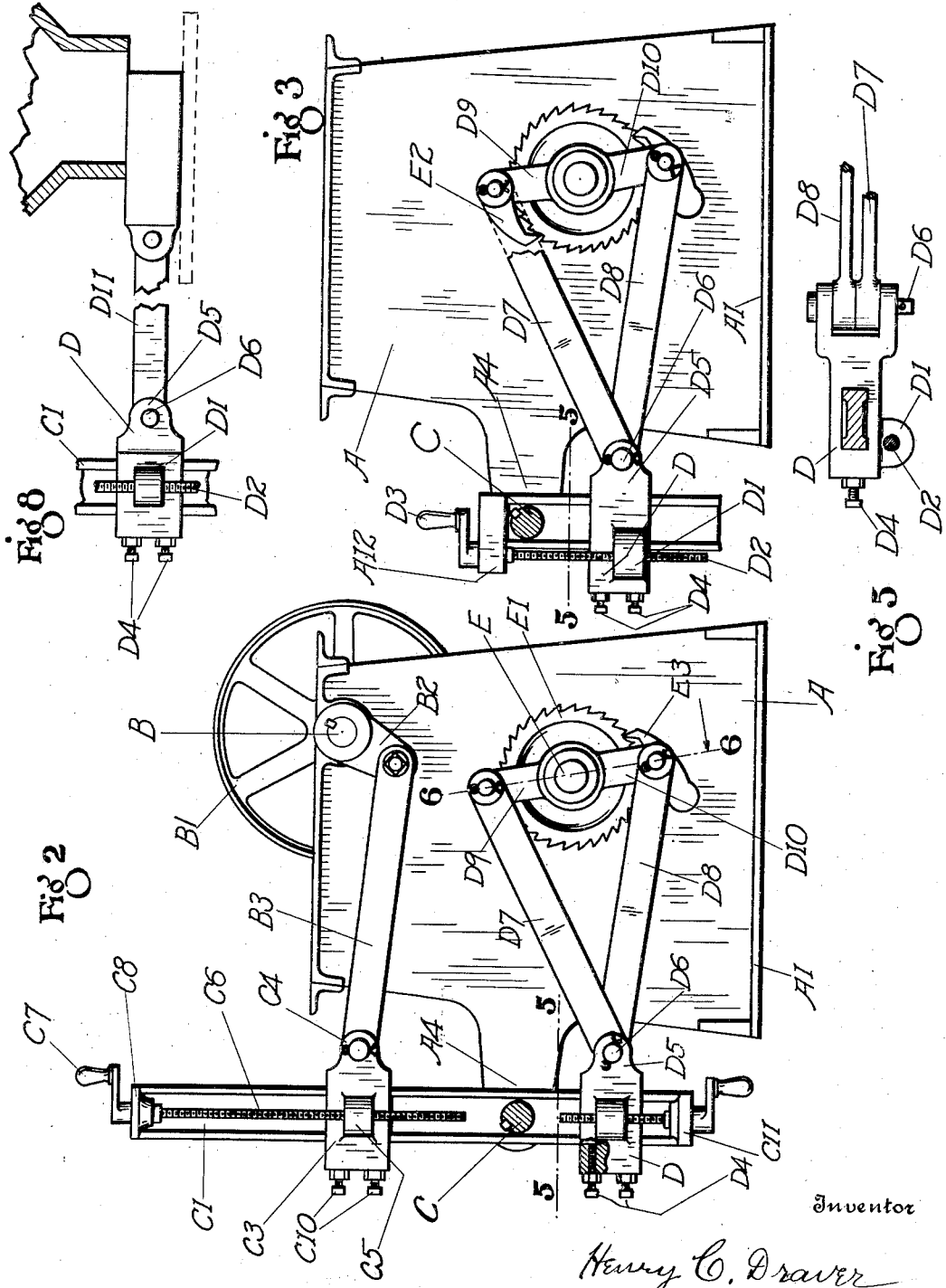

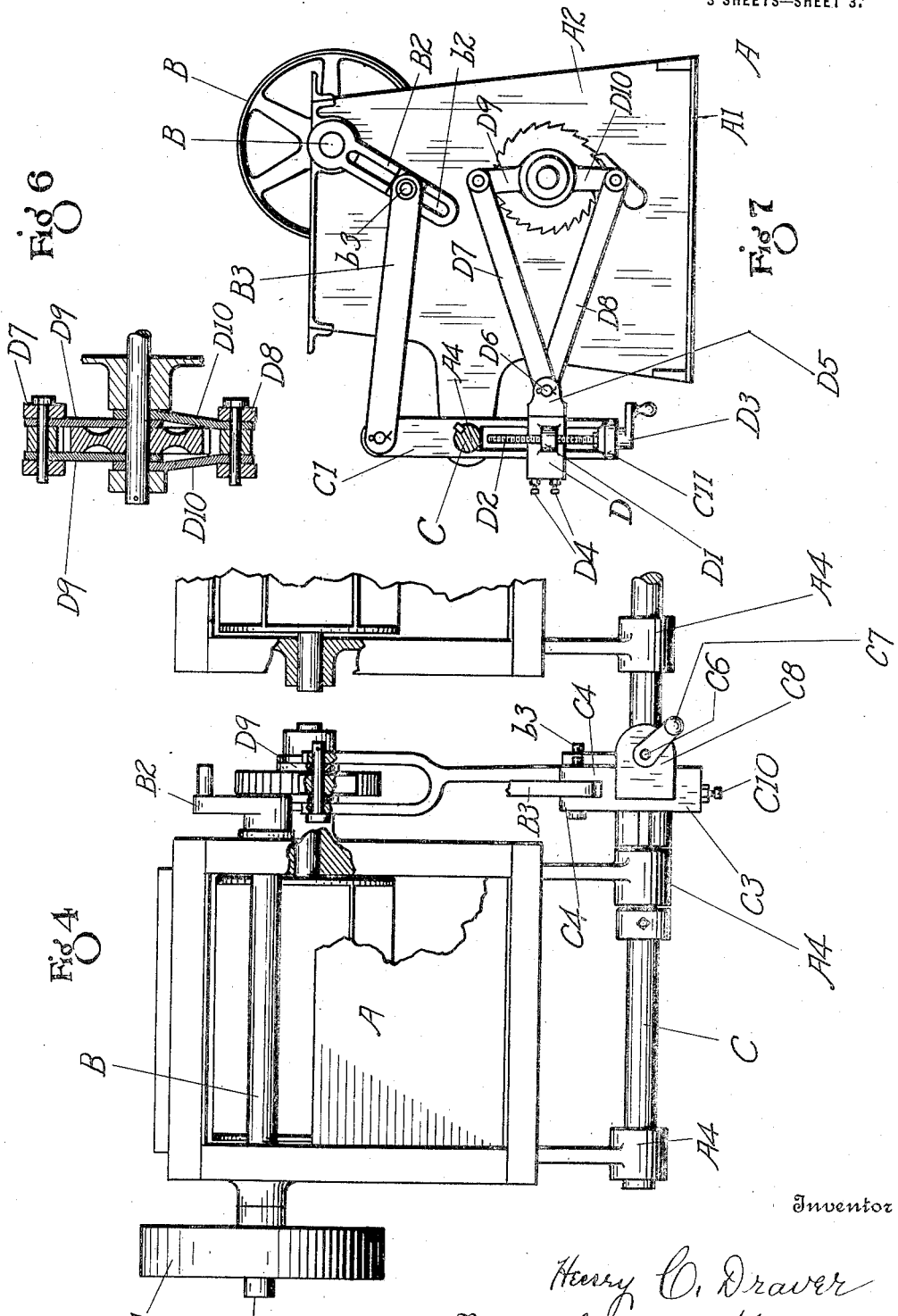

HENRY C. DRAVER, OF KNOXVILLE, TENNESSEE, ASSIGNOR TO W. J. SAVAGE COMPANY, A CORPORATION OF TENNESSEE.

FEED-REGULATOR.

1,357,854.     Specification of Letters Patent.     Patented Nov. 2, 1920.

Application filed August 11, 1919. Serial No. 316,702.

*To all whom it may concern:*

Be it known that I, HENRY C. DRAVER, a citizen of the United States, residing at Knoxville, in the county of Knox and State of Tennessee, have invented a new and useful Improvement in Feed-Regulators, of which the following is a specification, reference being had to the accompanying drawing.

My improvement relates particularly to feed regulators for mixing apparatus usually comprising a group or battery of feeder machines or units, all the units of a battery being operated from the same source of power and the material discharged from the several units being combined in chosen proportions after such discharge.

The object of the invention is to provide improved means for transmitting motion to the flow control members of the feed unit or units whereby the quantity of material discharged may be varied and whereby, when a plurality of feeder units are used the action of the flow control device in the several feeder units may be increased or diminished in the same ratio, in order that when the flow control devices of the individual units have been adjusted with reference to each other to discharge materials in the desired proportions for the making of a mixture composed of constituents bearing the desired percentage ratio, the entire output of the battery may be increased or diminished without disturbing that percentage ratio.

In the accompanying drawings,

Figure 1 is a side elevation of two battery units and a part of a third battery unit with my improved transmission mechanism applied thereto;

Fig. 2 is a section on the line, 2—2, of Fig. 1, looking toward the left;

Fig. 3 is a section on the line, 3—3, of Fig. 1, looking toward the left;

Fig. 4 is a plan of the mechanism shown in the left hand half of Fig. 1;

Fig. 5 is a horizontal section on the line, 5—5, of Figs. 2 and 3;

Fig. 6 is an upright section on the line, 6—6, of Fig. 2;

Fig. 7 is a view similar to Fig. 2, the means for transmitting motion to the rock shaft being modified;

Fig. 8 shows a modification.

Referring to said drawings, A, A, A, are individual battery or feeder units of ordinary form. Each such unit has a base, $A^1$, and end walls, $A^2$. The material is to be discharged through the base in the usual manner.

On each end wall is a horizontal bearing, $A^4$. All said bearings are in alinement with each other and a main shaft, C, (which in the form shown by the drawings is a rock shaft) is supported in said bearings. On said shaft adjacent one of said units is a rocking column, $C^1$, having a hub, $C^2$, surrounding and keyed to said shaft, so that the rocking of said column compels the rocking of said shaft. A drive shaft, B, extends through the walls, $A^2$, of said unit, parallel to the main shaft, C, and near the opposite side of the unit. On the end of the shaft, B, which is opposite the column, $C^1$, the shaft, B, has a crank, $B^2$. One end of a pitman, $B^3$, is coupled to said crank while the other end of said pitman extends between ears, $C^4$, on the block, $C^3$, which surrounds the column $C^1$, above the main shaft, C. A cross pin, $b^3$, extends through said ears and said pitman to couple said members to each other. On the upper end of the column, $C^1$, is a lateral ear, $C^8$, through which extends a shaft, $C^6$, the lower end of which also extends through an ear, $C^5$, on the block, $C^3$. The part of said shaft below the ear, $C^8$, is exteriorly screw threaded and the ear, $C^5$, is correspondingly interiorly screw threaded. Above the ear, $C^8$, the shaft, $C^6$, supports a crank, $C^7$, which rests on said ear. By turning said crank, the shaft is turned for raising or lowering the block, $C^3$, according to the direction of rotation of the shaft. Set bolts, $C^{10}$, extend horizontally through the block, $C^3$, and bear against the column, $C^3$, to firmly bind the block to the column after the latter has been brought to the desired elevation by turning the crank, $C^7$.

The opposite end of the drive shaft, B, bears a drive pulley, $B^1$, which is to be rotated for the rotation of the shaft, B.

From the foregoing it will be seen that a continuous rotation of the drive shaft will impart continuous rotation to the crank, $B^2$, and that results in a reciprocation of the pitman, $B^3$, and the block, $C^3$. That causes the rocking of the column, $C^1$, and since said column is keyed to the rock shaft, C, said shaft is rocked. The angle range through which the column, $C^1$, and the shaft, C, are rocked during the rotation of the shaft, B, depends upon the position of the block, $C^3$, on said column. Raising said block reduces and lowering said block increases the angular range of said rocking. Below the shaft, C, the column, $C^1$, is surrounded by a block, D, similar to the block, $C^3$. On said block is an ear, $D^1$, similar to the ear, $C^5$, on the block, $C^3$. On the lower end of the column, $C^1$, is a horizontal ear, $C^{11}$. A shaft, $D^2$, extends upward through the ear, $C^{11}$, and is threaded into the ear, $D^1$. Below the ear, $C^{11}$, said shaft bears a crank, $D^3$, similar to the crank, $C^7$. By turning said crank, the block, D, is moved upward or downward. Set bolts, $D^4$, extend horizontally through the block, D, to bear against the column, $C^1$, for firmly securing said block on said column when the block has been brought to the desired elevation by the aid of the shaft, $D^2$. The block, D, has ears, $D^5$, directed toward the opposite side of the machine. Each of two links, $D^7$ and $D^8$, has an end extending between said ears. A cross pin, $D^6$, extends through said ears and said links to couple the latter to the block, D.

The opposite end of the link, $D^7$, is coupled to the outer or free end of a rocking member, $D^9$, which loosely surrounds the shaft, E, which is parallel to the drive shaft, B, and extends through the feeder and rests in the end walls, $A^2$. A ratchet wheel, $E^1$, surrounds and is keyed to the shaft, E, adjacent the rocking member, $D^9$. On said rocking member is pivoted a pawl, $E^2$, in such manner as to have its point rest upon the teeth of the ratchet wheel.

The end of the link, $D^8$, opposite the block, D, is coupled to the lower or free end of a rocking member, $D^{10}$, which also loosely surrounds the shaft, E, adjacent the rocking member, $D^9$. To said rocking member, $D^{10}$, is pivoted a pawl, $E^3$, which is adapted to bear against the ratchet wheel. Said pawls are arranged in opposition to each other, the pawl, $E^2$, being adapted to engage and turn the ratchet wheel when said pawl is moved toward the left as viewed in Figs. 2 and 3, while the pawl, $E^3$, is adapted to engage and turn the ratchet wheel in the same direction during the movement of the pawl toward the right as viewed in Figs. 2 and 3. Both pawls are moved simultaneously in the same direction through the rocking of the column, $C^1$, the block, D, first pushing the links, $D^7$ and $D^8$, toward and then from the ratchet wheel, $E^1$. And during each reciprocation of the links, $D^7$ and $D^8$, one or the other of the pawls partially turns the ratchet wheel.

The distance through which the ratchet wheel is turned may be varied by varying the distance through which the links, $D^7$ and $D^8$, are moved endwise. That distance is varied by varying the elevation of the block, D, on the rocking column, $C^1$. For this, as above described, the crank, $D^3$, is turned for turning the screw shaft, $D^2$.

Adjacent each of the feeder units, a rocking column, $C^1$, also having a hub, $C^2$, surrounds the rocking shaft, C. But the part of said column above the shaft, C, is shorter than the column already described as being adjacent the first mixer unit and coupled to the crank which is supported on the drive shaft of the first unit.

On the lower end of the second column, $C^1$, is an adjustable slide block, D, which is identical with the block, D, already described. And a screw shaft, $D^2$, is applied to said block, D, to move said block up and down on said column; but said screw shaft is inverted, the part adjacent the crank, $B^3$, resting in an ear, $C^{12}$, which is located on the column above the rock shaft, and the lower end of said shaft extending through the ear, $B^1$, of said block.

The block, D, is coupled to links, $D^7$ and $D^8$, and the latter are coupled to rocking members, $D^9$ and $D^{10}$, which are applied loosely to the shaft, E, of the adjacent feeder unit. Said rocking members support pawls which engage the ratchet wheel, $E^1$, surrounding and fixed to said shaft, as already described in connection with the first feeder unit.

Other feeder units may be similarly associated with the rock shaft, and the shaft, E, of each unit may similarly receive motion from the rock shaft.

The rate of rotation of the shaft, E, of each feeder unit may be varied by varying the elevation of the corresponding block, D; and such variation of the rotation of the shaft, E, varies the quantity of material which is fed through the adjacent feeder unit. When the rate of rotation, relative to each other, of the several shafts, E, has thus been arranged, as may have been found desirable by observing the amount of material being discharged from each feeder unit, the rate of rotation of the shafts, E, may be collectively increased or diminished in the same ratio by increasing or diminishing the angular range through which the column, $C^1$, and the shaft, C, rocks, that being done by changing the relation between the drive shaft and the rock shaft.

It is to be observed that all the individual feeder units receive motion from the one rock shaft, and that the unit speed variation and the battery speed variation are effected by means associated with the rock shaft. In the form shown in Fig. 7, the relation between the drive shaft crank and the rocking column, $C^1$, is modified by coupling one end of the pitman, $B^3$, directly to the column, $C^1$, and forming a slot, $d^2$, in the crank, $B^2$, and coupling the opposite end of the pitman, B², adjustably to said crank along said slot. By moving said coupling farther from the drive shaft, B, the rocking column is moved through a larger angular range, and the reverse occurs when the coupling between the pitman and the crank is moved closer to the drive shaft, B.

Between the walls, A², A², the shaft, E, bears wings, E⁴ of ordinary form. Said shaft and wings constitute flow-controlling means.

In Fig. 8, the flow-controlling means is a slide member, E⁵, which is coupled to the ears, D⁵, of the block, D, by means of a link, D¹¹, which is substituted for the links, D⁷ and D⁸, already described. The distance through which the member, E⁵, is reciprocated may be varied by changing the elevation of the block, D, as already described.

I claim as my invention,

1. In an apparatus of the nature described, a feeder unit, flow-controlling means in said unit, a drive shaft, a rocking structure comprising a shaft rigid on the remainder of the rocking structure, transmission means connecting said drive shaft and said rocking structure, and transmission means connecting the flow-controlling means and the rocking structure, the connection between each transmission means and said rocking structure being adjustable on the rocking structure toward and from said shaft, substantially as described.

2. In an apparatus of the nature described, a feeder unit, flow-controlling means in said unit, a drive shaft, a rocking structure comprising a shaft rigid on the remainder of the rocking structure, transmission means connecting said drive shaft and said rocking structure at one side of the rocking structure axis, and transmission means connecting the flow-controlling means and the rocking structure at the opposite side of the rocking structure axis, the connection between each transmission means and said rocking structure being adjustable on the rocking structure toward and from said shaft, substantially as described.

In testimony whereof I have signed my name, this 30th day of July, in the year one thousand nine hundred and nineteen.

HENRY C. DRAVER.